Aug. 9, 1960
N. WESTHEIMER
2,948,472
AMPLITUDE PREDICTION MECHANISM
Filed Oct. 19, 1956
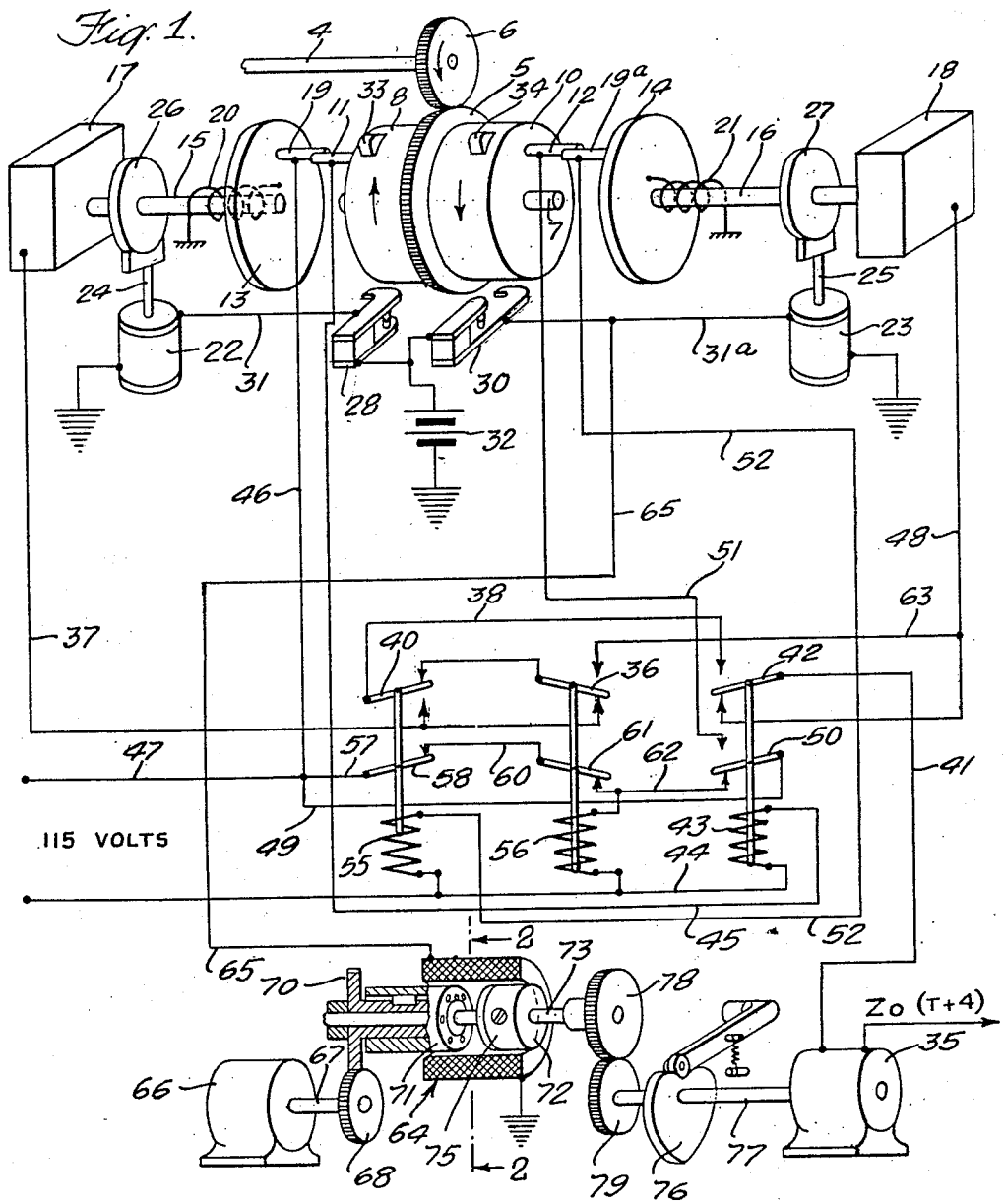
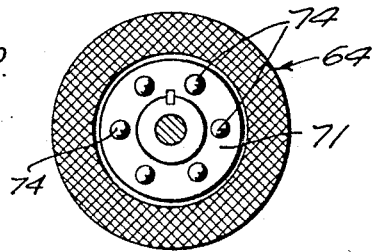
INVENTOR
NORBET WESTHEIMER
BY *Victor D. Borst*
ATTORNEY

United States Patent Office 2,948,472
Patented Aug. 9, 1960

2,948,472

AMPLITUDE PREDICTION MECHANISM

Norbert Westheimer, Forest Hills, N.Y., assignor to Sperry Rand Corporation, Ford Instrument Company Division, Long Island City, N.Y., a corporation of Delaware Filed Oct. 19, 1956, Ser. No. 617,073

5 Claims. (Cl. 235—186)

This invention relates to a mechanism for predicting the amplitude of a periodic function of fixed period but varying amplitude.

According to the invention the analog values of the periodic function, which is assumed to be sinusoidal, are introduced into the computer which determines the maximum amplitude of the function and synchronizes a resolver designed to yield a periodically fluctuating voltage so that there can be established a preselected phase relationship between the function and the resolver output. The maximum amplitude of the function is measured by the computer every half cycle of operation, and introduced to the resolver the output of which represents a predicted value for the amplitude at a preselected future time instant.

As a fire control instrument aboard ship, the computer is adapted to employ values representing ship's roll or pitch and predict its instantaneous position at some selected time in the future. The theory of operation of the computer predicates the amplitude of roll or pitch as varying sinusoidally with approximately a constant period and the maximum amplitude of roll or pitch remaining constant for at least one half cycle.

Additional advantages and features of the computer may be perceived on reading the detailed description in conjunction with the accompanying drawings, in which Fig. 1 is a general schematic view of the computer system; and Fig. 2 is an enlarged section taken on the line 2—2 of Fig. 1 showing the friction drive means associated with a solenoid clutch.

Where, for example, it is desired to determine the amplitude of a sinusoidal function four seconds from the moment of synchronization, the computer is mechanized to compute the following assumed equation:

(1)  $$Z_0(t+4) = Z_0(\text{max}) \sin \frac{360 \cdot (t+4)}{P}$$

where $t$ is time in seconds measured from the starting point of the cycle when the amplitude $Z_0$ of ship's roll passes zero in the positive direction; P is the period or time to complete one cycle in seconds (P is assumed to be constant); $Z_0$ (max) is the maximum value of the amplitude of the function which occurred in the last one half cycle; and $Z_0(t+4)$ is the instantaneous value of the amplitude four seconds in the future.

According to Fig. 1 a shaft 4 settable in accordance with the fluctuating values of ship roll, $Z_0$, drives gear 5 by means of gear 6 mounted on the shaft 4. The gear 5 is mounted on a shaft 7 and affixed to the gear 5 each side thereof and supported on the shaft 7 are drums 8 and 10 which carry drive pins 11 and 12, respectively which are electrical contacts as well as mechanical drive pins. Rotatable members 13 and 14 mounted on potentiometer shafts 15 and 16, respectively, carry drive pins 19 and 19ª and drive potentiometers 17 and 18, respectively, which are used to measure and store positive and negative maximum values of $Z_0$. The drive pins axially are supported at substantially the same radial distance from the axes of the drums and rotatable members and provide a one-way, pick-up clutch connection between the input shaft 4 and the potentiometers 17 and 18. The potentiometer shafts are oppositely and rotatively biased by springs 20 and 21 to restore the potentiometers to zero value on the release of the friction to ground solenoid operated clutches 22 and 23 which are provided with shoe engaging armatures 24 and 25, respectively. The brake shoes mounted on the armatures 24 and 25, are normally in engagement with brake drums 26 and 27 secured to the potentiometer shafts 15 and 16, respectively. The clutches 22 and 23 are momentarily released by the opening of switches 28 and 30 in D.C. lines 31 and 31ª supplied by a voltage source 32 to energize the coils of the solenoid clutches. The normally closed switches 28 and 30 are operated by means of cams 33 and 34 which are mounted on the drums 8 and 10, respectively, and are adapted to open the switches when $Z_0$ is increasing and decreasing, respectively, as explained below.

The means for setting the maximum values of $Z_0$ placed in the potentiometers into sine resolver 35 is as follows: potentiometer 17 is connected to switch 36 by means of lead 37. Switch 36 is connected to lead 38 through switch 40. Lead 38 feeds $Z_0$(max) to resolver input lead 41 through switch 42 shown open. The switch 42 is operated by relay 43 which is connected across a 115 v. source by means of line 44 and lead 45, drive pins 11 and 19, lead 46 and line 47. Switch 42 also connects resolver input lead 41 to output lead 48 of the potentiometer 18. Drive pins 12 and 19ª are adapted to close a circuit comprising line 47, lead 49, switch 50, lead 51, drive pin 12, drive pin 19ª, lead 52, relay 55 and line 44.

Relay 56 is operated by relay 43 and relay 55 being placed across the power source by virtue of line 47, lead 57, switch 58, lead 60 and switch 61 or by switch 50 and lead 62 on one side of the source and line 44 on the other side of the source. Relay 56 serves to operate switch 36 one terminal of which is connected to lead 48 by means of lead 63 so that the potentiometer 18 is connected into the resolver 35 when all the relays are deenergized as well as when only relay 43 is energized.

Line 31ª is connected to the coil of solenoid clutch 64 by lead 65. Clutch 64 is driven by constant time motor 66 through shaft 67. The motor 66 makes one complete revolution in the time for a period of $Z_0$. Gear 68 on the shaft 67 engages gear 70 which is keyed to slide armature sleeve 71 the annular end face of which is adapted to engage driven member 72 secured on shaft 73. As shown in Fig. 2 the end face of sleeve 71 supports a circular group of steel balls 74 which are adapted to engage a soft plastic end face 75 carried on the end of the member 72. A heart cam 76 on shaft 77 is driven by shaft 73 through gears 78 and 79. The shaft 77 is set by the heart cam 76 to establish a preselected phase relation to the input on shaft 4 when the clutch 64 releases shaft 73 from its connection with motor 66 at the start of each cycle. In this instance, the cam is set so that the phase of the shaft 77 will lead the phase of the input function on the shaft 4 by four seconds, that phase relation being maintained for this setting as a result of the fact that the period of the motor driven shaft 77 and the input function, which is assumed constant, is the same. The shaft 73 feeds this synchronized input to the resolver 35 which yields the predicted amplitude $Z_0$ in accordance with Equation 1.

The device operates as follows: potentiometers 17 and 18 are used to measure and store $Z_0$(max) for each one half cycle. In the position shown in Fig. 1 the value stored on the potentiometer 18 is transmitted to resolver 35 through lead 48, switch 42 and lead 41, and the potentiometer 17 is measuring a new value. Shaft 4 is driving potentiometer 17 through drive pins 11 and 19 and is approaching its maximum minus value. When this is reached the direction of rotation will reverse and drive pins 11 and 19 will break apart, the potentiometer 17 will be held at the maximum negative value that was reached by the solenoid operated clutch 22. The breaking apart of drive pins 11 and 19 will deenergize relay 43. The operation of relay 43 will switch the $Z_0$ connection to the new value stored by potentiometer 17. As $Z_0$ passes through 0 in the increasing direction the cam 34 will momentarily open switch 30 which will momentarily open clutch 23 and clutch 64. When clutch 23 opens the friction to ground that the clutch has been applying on potentiometer shaft 16 will be released, and the spring on the potentiometer shaft will rotate the potentiometer shaft so that drive pins 12 and 19a come into contact. $Z_0$ will now drive potentiometer 18 in the increasing direction through drive pins 12 and 19a. When drive pins 12 and 19a make contact relay 55 will be energized and the operation of relay 55 will deenergize relay 56. $Z_0$ will drive potentiometer 18 to its maximum positive value at which point the direction of rotation will reverse and drive pins 12 and 19a will break apart. Potentiometer 18 will be held at the maximum positive value that was reached by the friction to ground applied through clutch 23. The breaking apart of the drive pins 12 and 19a deenergizes the relay 55 which switches the $Z_0$ output connection to the new value stored by the potentiometer 18. As $Z_0$ passes through zero in the decreasing direction the cam 33 will momentarily open switch 28 which will momentarily open clutch 22. When the clutch 22 opens, the friction to ground that the clutch has been applying on potentiometer shaft 15 will be released and the spring on the potentiometer shaft will rotate the potentiometer shaft so that drive pins 11 and 19 come into contact. When contacts 11 and 19 close they will energize the relays 43 and 56. The mechanism is now in condition to start another cycle.

Modifications in the preferred embodiment of the invention may be made by those skilled in the art without departing from the scope of the invention as defined in the following claims.

What is claimed is:

1. A mechanism for predicting the amplitude $Z_0$ of a periodic function $f(\theta)$ comprising a shaft settable in accordance with the amplitude of said function, a pair of voltage producing devices, each of said devices being adapted to yield a voltage output proportional to a mechanical movement settable therein, mechanical means for alternately restoring said devices and connecting the devices to said shaft at the beginning of each half cycle of shaft oscillation so that at the end of each half cycle one of said devices will yield a voltage $Z_0$ (max) proportional to the maximum amplitude of the function as determined by the half cycle of oscillation of said shaft, a trigonometric resolver adapted to generate a voltage analog of $f(\theta)$, selective means for alternately connecting the devices to the resolver as the connection of said devices to said shaft is disestablished, and conveying thereto said maximum amplitude voltage $Z_0$(max) alternately determined by said devices, means for driving said resolver in accordance with the period of said function and with a preselected phase relation with respect to said function, said resolver having an output continuously determinative of the amplitude of the function $f(\theta)$ at a time in the future established by said preselected phase relation.

2. A mechanism as claimed in claim 1 wherein there is provided means for automatically disconnecting said resolver from said resolver driving means at the end of every complete cycle of shaft rotation whereby the phase relation of the input to said resolver introduced by the resolver driving means with respect to the periodic function on the shaft may be reestablished at the end of each cycle.

3. A mechanism as claimed in claim 2 wherein said mechanical means for alternately connecting the devices to said shaft include oppositely biased rotatable members, each of said members being separately in driving connection with one of said devices and having a one way, pick-up connection with said shaft.

4. A mechanism as claimed in claim 3 wherein said selective means include three relays, one relay being in operative connection with one of said rotatable members, the second relay being in operative connection with the second of said rotatable members and the third relay being in operative connection with said first and second relays.

5. A mechanism as claimed in claim 4 wherein said voltage producing devices are potentiometers, and releasable means are separately engageable with said rotatable members for successively holding the voltages placed in each of said potentiometers and establishing on their release a driving relation between said rotatable members and said shaft on alternate half cycles of shaft rotation.

References Cited in the file of this patent

UNITED STATES PATENTS

| | | |
|---|---|---|
| 2,404,011 | White | July 16, 1946 |
| 2,408,081 | Lovell et al. | Sept. 24, 1946 |
| 2,425,317 | Harris | Aug. 12, 1947 |
| 2,762,565 | Libman et al. | Sept. 11, 1956 |
| 2,817,479 | Newell et al. | Dec. 24, 1957 |